Sept. 12, 1933.  F. W. ROMBACH  1,926,651

SPRAY

Filed Nov. 19, 1931

Inventor
Fred W. Rombach
By C. W. Clement
Attorney

Patented Sept. 12, 1933

1,926,651

UNITED STATES PATENT OFFICE 1,926,651

SPRAY

Fred W. Rombach, Watsontown, Pa.

Application November 19, 1931
Serial No. 576,161

1 Claim. (Cl. 299—58)

This invention relates to improvements in vapor sprays especially adapted to produce a very fine spray or mist to be associated with a display stand for the purpose of keeping vegetables, flowers, produce and the like cool and moist without unduly drenching them with moisture. It is not limited to this particular use, but may be employed to humidify the air wherever desired. Said spray makes provision for the collection and disposal of excess moisture in the form of drops.

A further object of the invention resides in its simplicity of construction, making it economical to manufacture.

In the accompanying drawing forming part of this application:

Figure 1:
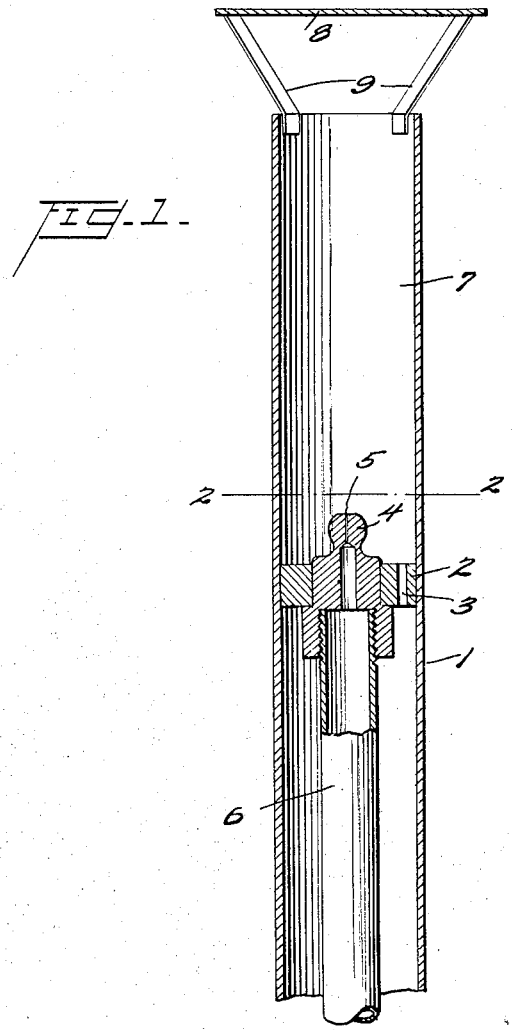
Figure 1 is a vertical sectional view of the spraying device.
Figure 2:
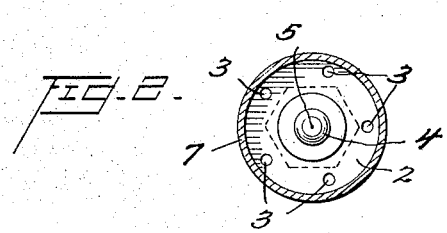
Figure 2 is a sectional view on line 2—2, Figure 1.

Referring to the drawing, 1 indicates a substantially tubular hood of indeterminate length having the same diameter through its length, within which is fixed a drain 2, having a plurality of drip holes 3. Loosely fitting into the center of said drain 2, is a ball shaped nozzle 4 which terminates below the top of the hood, having an extremely small outlet 5. In the device shown this out-let is .008 of an inch. Secured in the bottom of said nozzle 4 is a water supply pipe 6. 7 represents a chamber which lies between the fixed drain 2 and the top of the hood through which is discharged a very fine jet of water axially of said hood. On the top of said hood 1 is secured a spaced flat baffle plate 8, by means of spacing members 9, so arranged as to conduct drips from said plate into said hood. The diameter of said baffle plate 8 is double that of the hood 1.

The operation of the device is as follows:—
A stream of water is forced in a constant flow through the supply pipe and ball point nozzle, the peculiar construction of which is adapted to direct a minute stream or jet of water axially of said hood. The chamber between the nozzle and the top of the hood serves to keep the stream intact, the said stream being vaporized by being impinged against the baffle plate. If complete vaporization does not take place, any moisture which may collect on the baffle plate is returned to the hood by means of the supports of the baffle plate. The baffle plate being greater in diameter than that of the hood prevents down currents of air carrying the vapor directly downward, permits wider distribution of vapor.

What I claim as new and desire to secure by Letters Patent is:—

In a spray device, the combination of a substantially tubular hood of the same diameter through its length, a drain having a plurality of outlets fixedly secured within said hood, a water supply pipe in the upper end of which is secured a ball point nozzle with a minute outlet directed axially of said hood, said nozzle passing through an opening in said drain member and terminating below the top of said hood, a flat horizontal baffle plate twice the diameter of said hood secured to its top in close proximity to the top of the same and in spaced relation thereto by means of spacing members so arranged to conduct drips from said plate into said hood.

FRED W. ROMBACH.